United States Patent [19]

Ikura et al.

[11] Patent Number: 5,668,576
[45] Date of Patent: Sep. 16, 1997

[54] TRANSPARENT TOUCH PANEL WITH CONTRACTIBLE RESIN LAYER USED TO MAINTAIN VISIBILITY

[75] Inventors: Kenichirou Ikura; Kazuhiro Nishikawa, both of Kyoto, Japan

[73] Assignee: Nissha Printing co., Ltd., Kyoto, Japan

[21] Appl. No.: 537,816

[22] PCT Filed: Apr. 28, 1994

[86] PCT No.: PCT/JP94/00719

§ 371 Date: Oct. 24, 1995

§ 102(e) Date: Oct. 24, 1995

[87] PCT Pub. No.: WO94/25916

PCT Pub. Date: Nov. 10, 1994

[30] Foreign Application Priority Data

Apr. 28, 1993 [JP] Japan ................ 5-124970

[51] Int. Cl.⁶ ........................... G09G 5/00
[52] U.S. Cl. ........................... 345/173
[58] Field of Search ................ 345/173, 174; 178/18, 19

[56] References Cited

U.S. PATENT DOCUMENTS

| | | |
|---|---|---|
| 4,527,862 | 7/1985 | Arakawa . |
| 4,672,153 | 6/1987 | Kikuchi ................ 178/18 |
| 4,707,570 | 11/1987 | Ide et al. .............. 178/18 |
| 4,745,241 | 5/1988 | Furukawa et al. ...... 345/173 |
| 4,990,900 | 2/1991 | Kikuchi ............... 345/174 |
| 5,543,587 | 8/1996 | Ikura et al. .......... 178/18 |

FOREIGN PATENT DOCUMENTS

| | | |
|---|---|---|
| 59-104764 | 6/1984 | Japan . |
| 2-5308 | 1/1990 | Japan . |
| 4-18628 | 1/1992 | Japan . |

Primary Examiner—Richard Hjerpe
Assistant Examiner—Paul A. Bell
Attorney, Agent, or Firm—Wenderoth, Lind & Ponack

[57] ABSTRACT

A transparent touch panel includes a movable electrode film which is transparent and flexible, a hard coating layer which is transparent and formed on an upper surface of the movable electrode film, a movable electrode which is transparent and formed over a lower surface of the movable electrode film, a contractible resin layer which is transparent and formed between the movable electrode film and the movable electrode in correspondence to the hard coating layer, a fixed electrode-supporting member disposed in opposition to the lower surface of the movable electrode film, a fixed electrode formed on an upper surface of the fixed electrode-supporting member opposed to the lower surface of the movable electrode film, and spacers formed between the lower surface of the movable electrode film where the movable electrode is formed and the upper surface of the fixed electrode-supporting member where the fixed electrode is formed.

8 Claims, 1 Drawing Sheet

TRANSPARENT TOUCH PANEL WITH CONTRACTIBLE RESIN LAYER USED TO MAINTAIN VISIBILITY

TECHNICAL FIELD

The present invention relates to a transparent touch panel superior in outlook and visibility by preventing interference fringes or whitening from being generated and capable of having a high surface strength.

BACKGROUND ART

Conventionally, a transparent touch panel is used as an input device by disposing it on a display such as a liquid crystal display.

Such a known transparent touch panel is shown in FIG. 4, and adopts resistance films. In this transparent touch panel, a movable electrode film 2 on which a transparent movable electrode 4 has been formed is spaced by spacers 5 at a small interval from a fixed electrode-supporting member 8 on which a transparent fixed electrode 7 has been formed, and the movable electrode film 2 and the fixed electrode-supporting member 8 are bonded to each other such that the movable electrode 4 and the fixed electrode 7 are opposed to each other. In the transparent touch panel adopting this system, electrical continuity occurs across the movable electrode 4 and the fixed electrode 7 by pressing down the movable electrode film 2 with a finger or a pen. The upper surface of the movable electrode film 2 is damaged by repeating such an input operation. Thus, in order to protect the surface of the transparent touch panel, a hard coating layer 1 is often formed on the upper surface of the movable electrode film 2.

The conventional transparent touch panel has, however, a problem that interference stripes appear on the movable electrode film 2 or the movable electrode film 2 is likely to be whitened and thus the transparent touch panel has an unfavorable outlook and visibility, because of the following. That is, in forming the hard coating layer 1 on the upper surface of the movable electrode film 2, the movable electrode film 2 is heated or irradiated by ultraviolet rays to crosslink the hard coating layer 1. The resin of the hard coating layer 1 is not all crosslinked but some resins are not crosslinked only in the process of heating the movable electrode film 2 or irradiating the movable electrode film 2 by ultraviolet rays. In the movable electrode film 2 on which the hard coating layer 1 has been formed, a circuit for allowing electrical continuity across the movable electrode film 2 and the movable electrode 4 is printed with a conductive ink or an adhesive agent for bonding the movable electrode film 2 and the fixed electrode-supporting member 8 to each other is printed in the periphery of the movable electrode film 2. In such printing process, a heating treatment is carried out as a drying process. The hard coating layer 1 and the movable electrode film 2 are thermally contracted by this heating treatment, but the behavior of the hard coating layer 1 and that of the movable electrode film 2 are different from each other. That is, crosslinking of uncrosslinked resin of the hard coating layer 1 proceeds due to the heating treatment performed in the printing process. Thus, the thermal contraction coefficient of the hard coating layer 1 exceeds that of the movable electrode film 2. Consequently, the middle portion of the movable electrode film 2 which has integrally adhered to the hard coating layer 1 is warped in a direction where a recess is formed as shown in FIG. 4, thus becoming abnormally close to the fixed electrode-supporting member 8. As a result, interference fringes are likely to appear around the recess of the movable electrode film 2 toward the edges thereof, thus deteriorating the outlook and visibility of the transparent touch panel.

In addition, a polymer called oligomer which is an uncrosslinkable component of the movable electrode film 2 is deposited on the surface of the movable electrode film 2, and thus it is possible that the surface of the movable electrode film 2 will become withened. Specifically, the movable electrode film 2 is significantly whitened when polyethylene terephthalate is used as the movable electrode film 2. Oligomer is likely to be deposited on the surface of the movable electrode film 2 after heating treatment in the process of manufacturing the transparent touch panel is completed or after environment-resistant property testing is conducted on the transparent touch panel, because the deposition of oligomer is accelerated by heating and humidification. The whitened movable electrode film 2 deteriorates the transparency of the transparent touch panel, thus deteriorating the outlook and visibility thereof.

It is conceivable to thicken the hard coating layer 1 to increase the surface strength of the transparent touch panel. But the degree of the warpage of the movable electrode film 2 in the middle thereof increases in the direction to form the recess with the increase in the thickness of the hard coating layer 1. Thus, there is a limitation on increasing the surface strength of the transparent touch panel.

Accordingly, it is an object of the present invention to solve the above-described disadvantages and provide a transparent touch panel superior in outlook and visibility by preventing interference fringes or whitening from being generated and capable of having a high surface strength.

DISCLOSURE OF THE INVENTION

In order to achieve the above object, according to one aspect of the present invention, a transparent touch panel is so constructed as to comprise a movable electrode film transparent and flexible; a hard coating layer transparent and formed on an upper surface of the movable electrode film; a movable electrode transparent and formed over a lower surface of the movable electrode film; a contractible resin layer transparent and formed between the movable electrode film and the movable electrode; a fixed electrode-supporting member disposed in opposition to the lower surface of the movable electrode film; a fixed electrode formed on an upper surface of the fixed electrode-supporting member opposed to the lower surface of the movable electrode film; and spacers formed between the lower surface of the movable electrode film where the movable electrode is formed and the upper surface of the fixed electrode-supporting member where the fixed electrode is formed.

BRIEF DESCRIPTION OF THE DRAWINGS

These and other objects and features of the present invention will become clear from the following description taken in conjunction with the preferred embodiments thereof with reference to the accompanying drawings, in which.

BEST MODE FOR CARRYING OUT THE INVENTION

Figure 1:
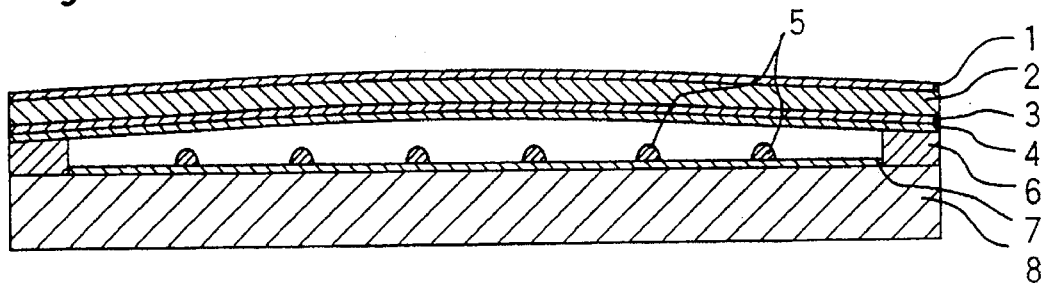
FIG. 1 is a sectional view showing a transparent touch panel according to a first embodiment of the present invention.

Before the description of the present invention proceeds, it is to be noted that like parts are designated by like reference numerals throughout the accompanying drawings.

Transparent touch panels according to first through third embodiments of the present invention are described below with reference to FIGS. 1 through 3.

Figure 2:
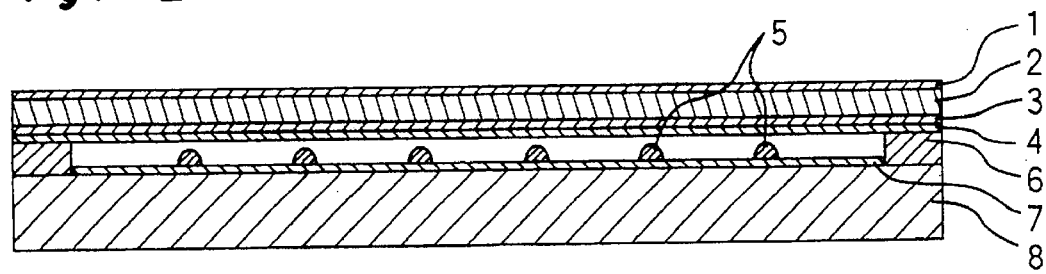
FIG. 2 is a sectional view showing a transparent touch panel according to a second embodiment of the present invention.

The construction of the transparent touch panel, shown in FIG. 1, according to the first embodiment is identical to that of the transparent touch panel, shown in FIG. 2, according to the second embodiment except that members disposed on a movable electrode film side according to the former are curved upward and those disposed on the movable electrode film according to the latter are flat. Thus, the transparent touch panels are described based on FIG. 1, and thus the transparent touch panel, according to the latter, shown in FIG. 2 is described with regard only to the distinctive point thereof.

In FIG. 1, reference numeral 1 denotes a hard coating layer, 2 denotes a movable electrode film, 3 denotes a contractible resin layer, 4 denotes a movable electrode, 5 denotes a spacer, 6 denotes a peripheral adhesive layer, 7 denotes a fixed electrode, 8 denotes a fixed electrode-supporting member, 9 denotes an adhesive agent, and 10 denotes a supporting film.

The transparent touch panel according to this embodiment is so constructed that the hard coating layer 1 is formed on the upper surface of the transparent movable electrode film 2, the transparent contractible resin layer 3 is formed on the lower surface of the movable electrode film 2, and the movable electrode 4 is formed on the lower surface of the contractible resin layer 3 and is opposed to the fixed electrode 7 via a plurality of the spacers 5. The fixed electrode 7 is formed on one of the surfaces of the fixed electrode-supporting member 8.

The movable electrode film 2 is made of a flexible transparent film. As the movable electrode film 2, for example, a transparent film made of polyethylene terephthalate resin, polycarbonate resin, cellulose resin, triacetate resin, or polyether sulfone resin can be used. Preferably, the thickness of the transparent film is about 100–200 µm. The movable electrode film 2 is constituted by one film or may be constituted by a plurality of films layered one on the other.

The hard coating layer 1 is formed over an entirety of the upper surface of the movable electrode film 2. As materials of the hard coating layer 1, an inorganic material such as siloxane series resins or an organic material such as acrylic epoxy resins can be used. The appropriate thickness of the hard coating layer 1 is 1–15µm. If the thickness of the hard coating layer 1 is less than 1 µm, it is difficult for the hard coating layer 1 to protect the movable electrode film 2, whereas if the thickness of the hard coating layer 1 is more than 15 µm, it is difficult to form the hard coating layer 1 itself.

The contractible resin layer 3 is formed over an entirety of the lower surface of the movable electrode film 2. It is advantageous in manufacture that the contractible resin layer 3 uses the same resin as that of the hard coating layer 1. It is possible to use transparent crosslinkable resin such as melamine resin or acrylic resin as the contractible resin layer 3. The thermal contraction coefficient of the contractible resin layer 3 is so set that the total of the thermal contraction coefficient of the contractible resin layer 3 and that of the movable electrode 4 is equal to or more than that of the hard coating layer 1 to prevent the middle of the movable electrode film 2 from being recessed (or warped) downward due to the thermal contraction of the hard coating layer 1. If the thermal contraction of the movable electrode 4 can be ignored because the thickness thereof is very small, the thermal contraction coefficient of the contractible resin layer 3 is set to be equal to or more than that of the hard coating layer 1. Thus, in order to control the thermal contraction coefficients in such a manner, the material of the hard coating layer 1 and that of the contractible resin layer 3 are differentiated from each other or the thicknesses of the two layers are varied relative to each other. In controlling the thermal contraction coefficients by varying the thickness of the two layers, the contractible resin layer 3 has the thickness necessary for the middle of the movable electrode film 2 not to end up being recessed, and for the middle of the movable electrode film 2 to be warped slightly upward so as to form an upper projection as shown as the first embodiment in FIG. 1 or for the movable electrode film 2 to be flat as shown as the second embodiment in FIG. 2. Preferably, the thickness of the contractible resin layer 3 is set to be 0.5–3 times as large as that of the hard coating layer 1. If the thickness of the contractible resin layer 3 is less than 0.5 times as large as that of the hard coating layer 1, it is difficult to prevent the middle of the movable electrode film 2 from being finally recessed (or warped) downward. If the thickness of the contractible resin layer 3 is more than three times as large as that of the hard coating layer 1, there is a great possibility that the middle of the movable electrode film 2 will finally be warped substantially upward so as to form an upper projection.

The movable electrode 4 is formed over the lower surface of the movable electrode film 2 via the contractible resin layer 3. The movable electrode 4 uses a transparent conductive film made of metal such as gold, silver, copper, tin, nickel, or palladium or a transparent conductive film made of metal oxide such as tin oxide, indium oxide, antimony oxide, zinc oxide, cadmium oxide, or indium tin oxide (ITO). As the method of forming the movable electrode 4, vacuum deposition, sputtering, ion plating, or CVD methods can be used.

Figure 3:
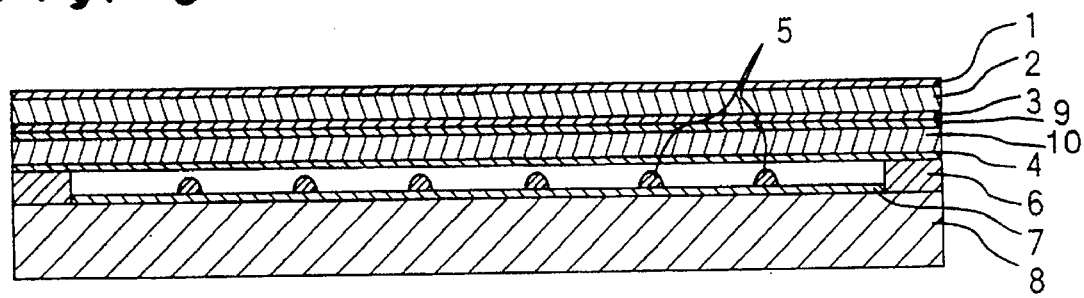
FIG. 3 is a sectional view showing a transparent touch panel according to a third embodiment of the present invention.
Figure 4:
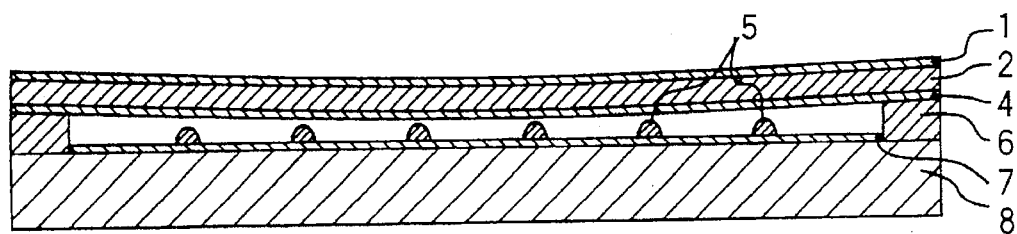
FIG. 4 is a sectional view showing a conventional transparent touch panel.

Instead of forming the transparent conductive film as the movable electrode 4 on the contractible resin layer 3 formed on the lower surface of the movable electrode film 2, the movable electrode 4 may be formed by bonding a supporting film on which a transparent conductive film has been formed as the movable electrode 4 to the contractible resin layer 3 via an adhesive agent, like the third embodiment of the present invention shown in FIG. 3. As an example of the supporting film, polyethylene terephthalate resin having a thickness of 12–50 µm is used. Acrylic resins can be used as an example of the adhesive agent. In a case of the third embodiment, the middle of the movable electrode film 2 can be prevented from being recessed (or warped) downward due to the thermal contraction of the hard coating layer 1 by setting the total of the thermal contraction coefficient of the contractible resin layer 3, that of the movable electrode 4, that of the supporting frame 10, and that of the adhesive agent 9 to be equal to or more than that of the hard coating layer 1.

The fixed electrode-supporting member 8 is made of a transparent film or a transparent glass. For example, a polyester film or a glass plate may be used as the fixed electrode-supporting member 8.

The fixed electrode 7 is formed on the upper surface of the fixed electrode-supporting member 8. A transparent conductive film such as ITO can be used as the fixed electrode 7.

The spacers 5 are provided between the movable electrode 4 and the fixed electrode 7 to space both electrodes from each other at a predetermined interval. The spacers 5 are formed on the movable electrode 4 or the fixed electrode 7. The spacers 5 can be obtained by forming transparent resin such as photosensitive acrylic or photosensitive polyester into fine dots by photo-processing. Further, a plurality of fine dots are formed by printing to obtain the spacers 5.

The peripheral adhesive layer 6 serves to bond the periphery of a movable side member having the movable electrode film 2 and the movable electrode 4 and the periphery of a fixed side member having the fixed electrode-supporting member 8 and the fixed electrode 7 to each other. The peripheral adhesive layer 6 can be formed by applying an adhesive agent made of acrylic resin, epoxy resin, phenol resin, or vinyl resin to the periphery of the lower surface of the movable electrode film 2 or the periphery of the movable electrode 4 formed under the lower surface of the movable electrode film 2 and to one side or both sides of the periphery of the upper surface of the fixed electrode-supporting member 8. A sticky adhesive material of a pressure sensitive adhesive double coated tape can be preferably used as the peripheral adhesive layer 6.

Since in each of the transparent touch panels according to the first through third embodiments, the hard coating layer 1 is formed on the upper surface of the movable electrode film 2 and the contractible resin layer 3 and the movable electrode 4 are formed on the lower surface of the movable electrode film 2, the following actions can be performed.

The following behavior is shown as a result of thermal treatment carried out to dry the conductive ink and the adhesive agent printed on the movable electrode film 2 in the process of manufacturing the transparent touch panel.

If the thermal contraction coefficient of the hard coating layer 1 formed on the upper surface of the movable electrode film 2 is almost equal to the total of the thermal contraction coefficient of the contractible resin layer 3 formed on the lower surface of the movable electrode film 2 and the thermal contraction coefficients of the movable electrode 4 etc., the movable electrode film 2 becomes flat because the warpage of the movable electrode film 2 is offset by the contraction of the contractible resin layer 3. This case is indicated as the second embodiment shown in FIG. 2 or the third embodiment shown in FIG. 3.

If the thermal contraction coefficient of the contractible resin layer 3 is set to be larger than the above case, the middle of the movable electrode film 2 is warped a little upward so as to form an upward projection. This case is indicated as the first embodiment shown in FIG. 1.

Accordingly, in the first and second embodiments, the intervals between the movable electrode films 2 and the fixed electrode-supporting members 8 can be appropriately maintained. Further, oligomer is not deposited from the movable electrode film 2 because the upper surface of the movable electrode film 2 is coated with the hard coating layer 1 and the lower surface thereof is coated with the contractible resin layer 3. Thus, the movable electrode film 2 can be prevented from being whitened. Further, the thermal contraction coefficient of the contractible resin layer 3 can be set to any desired value by adjusting the kind and thickness thereof so as to adjust the balance between the thermal contraction coefficient of the contractible resin layer 3 and that of the hard coating layer 1.

More specific examples are shown below.

EXAMPLE 1

As a movable electrode film, a 125 μm thick polyester film was used and a 1 μm thick hard coating layer made of a silane resin as a base was formed on the upper surface of the movable electrode film.

Then, the lower surface of the movable electrode film was coated with an acrylic resin, and the acrylic resin was dried to form a 3 μm thick contractible resin layer.

Thereafter, a transparent conductive film made of ITO was formed, by sputtering, on the entire surface of the contractible resin layer of the movable electrode film to form a movable electrode.

As a fixed electrode-supporting member, a 1.1 mm thick glass was used, and a transparent conductive film made of ITO was formed on the entirety of one surface of the glass to form a fixed electrode. Then, spacers each having a diameter of 40 μm were formed on the fixed electrode by using a photosensitive acrylic resin through photo-processing.

A transparent acrylic adhesive agent was applied to the periphery of the lower surface of the movable electrode film and the periphery of the upper surface of the fixed electrode-supporting member, and the movable electrode film and the fixed electrode-supporting member were bonded to each other so that the movable electrode and the fixed electrode were opposed to each other. In this manner, a transparent touch panel was obtained.

The transparent touch panel constructed in this manner was forcibly heated at 120° C. for 30 minutes. The result was that the middle of the movable electrode film was warped a little upward so as to form an upward projection, and neither interference fringes nor the whitened portion was observed.

EXAMPLE 2

A 125 μm polyester film having both surfaces thereof subjected to corona treatment and both ends thereof subjected to knurled treatment was used as the movable electrode film. The upper surface of the polyester film was coated with an acrylic resin in a thickness of about 8 μm and the acrylic resin was irradiated by ultraviolet rays to harden it so as to form a hard coating layer thereon.

Then, the surface, of the movable electrode film, on which the hard coating layer 1 had not been formed was coated with the same resin as the hard coating layer in a thickness of approximately 4 μm and the resin was irradiated by ultraviolet rays to harden it to form a contractible resin layer. Then, the contractible resin layer was coated with an adhesive agent of an acrylic resin having a high transparency in a thickness of approximately 25 μm.

A transparent conductive film made of ITO was formed on the entire surface of a 25 μm thick supporting film made of polyethylene terephthalate by sputtering to form a movable electrode film for preparation. Then, the surface, of the supporting film, opposed to the surface on which the movable electrode film had been formed and the acrylic adhesive agent of the movable electrode film were bonded to each other.

In a similar manner to Example 1, a fixed electrode-supporting member on which spacers and a fixed electrode had been formed was prepared. The movable electrode and the fixed electrode-supporting member were bonded to each other, with the movable electrode and the fixed electrode opposed to each other in a similar manner to Example 1. Thus, a transparent touch panel was obtained.

Forcibly heating the transparent touch panel formed thus at 120° C. for 30 minutes, the movable electrode film was almost flat and neither interference fringes nor the whitened portion were observed. It was found that the surface of the transparent touch panel was not damaged although 200,000 words had been inputted with a pen made of polyoxymethylene resin.

As described above, the transparent touch panel according to the present invention comprises the hard coating layer formed on one of the surfaces of the movable electrode film and the contractible resin layer, having a thermal contraction coefficient equal to or more than that of the hard coating layer, formed on the other surface of the movable electrode film. Thus, the following effects can be obtained.

That is, either the movable electrode film is not warped or, if the movable electrode film is warped, the movable electrode film was initially warped a little upward so as to form an upward projection, thus keeping a predetermined interval between the movable electrode film and the fixed electrode-supporting member and preventing the generation of interference fringes. Accordingly, when the transparent touch panel is set on a display such as an LCD and an image is watched via the transparent touch panel, interference fringes are not observed. That is, the transparent touch panel is superior in its outlook and visibility.

The movable electrode film is not whitened because oligomer is not deposited from the movable electrode film. Thus, the transparent touch panel has a high transparency and is thus superior in its outlook and visibility.

Moreover, the warpage degree of the movable electrode film can be controlled by adjusting the kind and thickness of the contractible resin layer. Thus, the thickness of the hard coating layer can be easily increased. Accordingly, the transparent touch panel can be allowed to have a high surface strength.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A transparent touch panel comprising:

a movable electrode film transparent and flexible;

a hard coating layer transparent and formed on an upper surface of the movable electrode film;

a movable electrode transparent and formed over a lower surface of the movable electrode film;

a contractible resin layer transparent and formed between the movable electrode film and the movable electrode;

a fixed electrode-supporting member disposed in opposition to the lower surface of the movable electrode film;

a fixed electrode formed on an upper surface of the fixed electrode-supporting member opposed to the lower surface of the movable electrode film; and spacers formed between the lower surface of the movable electrode film where the movable electrode is formed and the upper surface of the fixed electrode-supporting member where the fixed electrode is formed.

2. The transparent touch panel as claimed in claim 1, further comprising a supporting frame provided between the contractible resin layer and the movable electrode.

3. The transparent touch panel as claimed in claim 1, wherein a thickness of the movable electrode film is 100–200 µm, a thickness of the hard coating layer is 1–15 µm, and a thickness of the contractible resin layer is 0.5–3 times as large as that of the hard coating layer.

4. The transparent touch panel as claimed in claim 1, wherein a thermal contraction coefficient of the hard coating layer is almost equal to a total of a thermal contraction coefficient of the contractible resin layer and that of the movable electrode.

5. The transparent touch panel as claimed in claim 1, wherein a total of a thermal contraction coefficient of the contractible resin layer and that of the movable electrode is greater than that of the hard coating layer.

6. The transparent touch panel as claimed in claim 2, wherein a thermal contraction coefficient of the hard coating layer is almost equal to a total of a thermal contraction coefficient of the contractible resin layer, that of the supporting frame, and that of the movable electrode.

7. The transparent touch panel as claimed in claim 2, wherein a total of a thermal contraction coefficient of the contractible resin layer, that of the supporting frame, and that of the movable electrode is greater than that of the hard coating layer.

8. The transparent touch panel as claimed in claim 2, wherein the hard coating layer is made of acrylic resin; the movable electrode film is made of polyester film; the contractible resin layer is made of acrylic resin; the supporting frame is made of polyethylene terephthalate; an adhesive agent is made of acrylic resin; the movable electrode is made of ITO; the spacers are made of photosensitive acrylic resin; the fixed electrode is made of ITO; and the fixed electrode-supporting member is made of glass.

* * * * *